(12) United States Patent
Gray et al.

(10) Patent No.: US 7,288,136 B1
(45) Date of Patent: Oct. 30, 2007

(54) HIGH CAPACITY IMMOBILIZED AMINE SORBENTS

(75) Inventors: McMahan L. Gray, Pittsburgh, PA (US); Kenneth J. Champagne, Fredericktown, PA (US); Yee Soong, Monroeville, PA (US); Thomas Filburn, Granby, CT (US)

(73) Assignee: United States of America Department of Energy, Washington, DC (US)

( * ) Notice: Subject to any disclaimer, the term of this patent is extended or adjusted under 35 U.S.C. 154(b) by 334 days.

(21) Appl. No.: 11/034,008

(22) Filed: Jan. 13, 2005

(51) Int. Cl.
*B01D 53/04* (2006.01)
*B01J 20/30* (2006.01)

(52) U.S. Cl. .................. 95/139; 423/228; 502/439
(58) Field of Classification Search .............. 96/108, 96/153; 95/90, 139, 148; 423/220, 228, 423/230; 502/55, 417, 439
See application file for complete search history.

(56) References Cited

U.S. PATENT DOCUMENTS

| | | | |
|---|---|---|---|
| 3,491,031 A | 1/1970 | Stoneburner | |
| 4,810,266 A | 3/1989 | Zinnen et al. | |
| 5,376,614 A | 12/1994 | Birbara et al. | |
| 5,492,683 A | 2/1996 | Birbara et al. | |
| 5,620,940 A | 4/1997 | Birbara et al. | |
| 5,876,488 A | 3/1999 | Birbara et al. | |
| 6,364,938 B1 | 4/2002 | Birbara et al. | |
| 6,547,854 B1 | 4/2003 | Gray et al. | |
| 6,755,892 B2 | 6/2004 | Nalette et al. | |
| 2002/0083833 A1* | 7/2002 | Nalette et al. | ......... 95/139 |

OTHER PUBLICATIONS

Internet document "Mini-Encyclopedia of Papermaking and Wet-end Chemistry: Polyethylene Imine," http://www4.ncsu.edu/~hubbe/PEI.htm.*

* cited by examiner

*Primary Examiner*—Frank M. Lawrence
(74) *Attorney, Agent, or Firm*—Joy Alwan; Mark P. Dvorscak; Paul A. Gottlieb

(57) ABSTRACT

A method is provided for making low-cost $CO_2$ sorbents that can be used in large-scale gas-solid processes. The improved method entails treating an amine to increase the number of secondary amine groups and impregnating the amine in a porous solid support. The method increases the $CO_2$ capture capacity and decreases the cost of utilizing an amine-enriched solid sorbent in $CO_2$ capture systems.

8 Claims, 3 Drawing Sheets

HIGH CAPACITY IMMOBILIZED AMINE SORBENTS

CONTRACTUAL ORIGIN OF INVENTION

The United States Government has rights in this invention through an employer-employee relationship between the U.S. Department of Energy and The National Energy Technology Laboratory.

BACKGROUND OF THE INVENTION

1. Field of the Invention

This invention relates to an improved method for the production of carbon dioxide sorbents, and more specifically, this method relates to a method to produce amine-based sorbents for use to extract $CO_2$ from utility effluents.

2. Background of the Invention

Separation and capture of carbon dioxide ($CO_2$) have been identified as a high-priority research topic in Department of Energy (DOE) reports. The costs of separation and capture, including compression to the required pressure for the sequestration step, are generally estimated to comprise about three-fourths of the total cost of ocean or geologic sequestration. An improvement of the separation and capture of $CO_2$ will reduce the total cost required for sequestration.

The most likely options for $CO_2$ separation and capture include chemical absorption, physical and chemical adsorption, low-temperature distillation, gas-separation membranes, mineralization/biomineralization, and vegetation. The $CO_2$ absorption process employing aqueous amine solutions (i.e., wet chemical stripping) have been used for the removal of $CO_2$ from gas streams in some industries. This process, based on the principles of chemical absorption of $CO_2$ via monoethanolamine (MEA) or diethanolamine (DEA), is a potential technique for capturing greenhouse gas emissions from flue gas streams.

Wet chemical stripping of $CO_2$ involves one or more reversible chemical reactions between $CO_2$ and another substance such as MEA to produce a liquid species, such as a carbonate. Upon heating, the carbonate (heretofore isolated from the $CO_2$ feed stream) breaks down to free $CO_2$, with the original amine regenerated to react with additional $CO_2$. An example of the process, with monoethanolamine, is:

Equation 1:

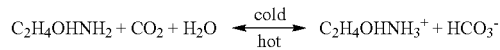

Another proposed reaction sequence has been identified by Hook, R. J., *Ind. Eng. Chem. Res.*, 1997, 36, 1779-90, and which is shown below as Equation 2.

These carbon dioxide capture and regeneration methods require high temperatures or very low vacuum. The process is complicated, costly, and energy intensive. Further, the amine solution has a limited lifetime due to degradation through oxidation of the amine. In addition, corrosion problems are usually seen in the aqueous amine process. Water usage is excessive due to the mechanism, corrosiveness, and air flow problems created by the use of amines such as MEA and DEA.

Equation 2:

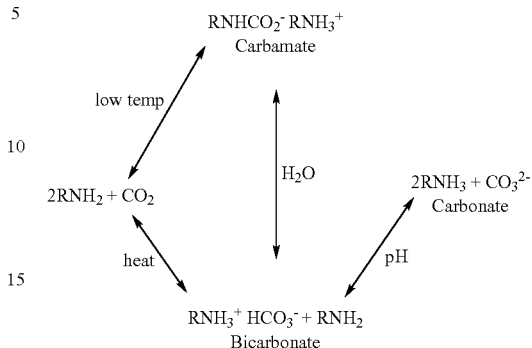

Solid amine-immobilized sorbents have the potential of reducing corrosion, energy cost, application of corrosion inhibitors, and mass heat transfer problems inherent with liquid capture systems. As a result, immobilized amine sorbents (IAS) are being used in controlled environments such as aircraft, submarine, and spacecraft. However, the cost of these sorbents is too expensive for large-scale applications in the utility industry.

Aqueous $CO_2$ capture systems use primary, secondary, and tertiary alkanol-amines to transform $CO_2$ into bicarbonate. These liquid amine systems require two moles of amine to one mole of $CO_2$ for the formation of stable bicarbonate compounds.

U.S. Pat. No. 3,491,031 awarded to Stoneburner on Jan. 20, 1970 discloses a method to create a $CO_2$ sorbent by treating activated carbon with gaseous alcohol amines such as MEA. It utilizes a wet-chemical stripping method employing MEA to remove the adsorbed $CO_2$ and regenerate the sorbent.

U.S. Pat. No. 6,547,854 awarded to Gray et al., on Apr. 15, 2003 discloses a method to create solid $CO_2$ sorbents by the treatment of an acidified or basified solid substrate with a substituted amine salt.

U.S. Pat. No. 6,364,938 awarded to Birbara et al. on Apr. 2, 2002 discloses a method to create $CO_2$ sorbents by the incorporation of amine groups into a polymer substrate or backbone. The method is applicable to low load situations such as human breathing environments.

U.S. Pat. No. 6,755,892 B2 awarded to Nalette, et al. on Jun. 29, 2004 discloses a $CO_2$ absorbing method wherein sorbent beds are cycled between absorbing $CO_2$ and desorbing $CO_2$.

U.S. Pat. No. 5,876,488 awarded to Birbara et al. on Mar. 2, 1999 discloses a method to create $CO_2$ sorbents by dispersing aqueous amines in polymeric materials. Such sorbents are limited in application to human breathing environments and at ambient temperatures of 25° C.

U.S. Pat. Nos. 5,620,940, 5,492,683 and 5,376,614, all awarded to Birbara et al. disclose methods to create $CO_2$ sorbents by using amine-polyols on chemically inert supports. Sorbent desorption methods employ heat and/or reduced pressure.

U.S. Pat. No. 4,810,266 awarded to Zinnen, et al. on Mar. 7, 1989 discloses a method to create $CO_2$ sorbents by treating carbonized molecular sieves with alcohol amines.

A need exists in the art for a method to produce amine-enriched sorbents for the capture of $CO_2$ from high-output fluids such as flue gas and natural gas streams. A need also exists for a sorbent that does not require energy-intensive use of water during $CO_2$ capture processes and which retains $CO_2$ over a range of operating temperatures. The sorbent should be thermally stable and easily regenerated.

SUMMARY OF INVENTION

An object of the present invention is to provide a method for synthesizing amine-enriched sorbents that overcomes many of the disadvantages of the prior art.

Another object of the present invention is to provide an improved method for synthesizing amine-enriched sorbents. A feature of the invention is the utilization of Michael reactions to increase the concentration of secondary amines in the sorbent. An advantage of the invention is the process has few steps and does not require expensive reactants and solvents to produce a sorbent.

Still another object of the present invention is to provide an amine-enriched sorbent suitable for large scale processes. A feature of the invention is that the modified amines have an increased capacity for $CO_2$ capture. Another feature of the invention is that the sorbent does not require energy-intensive uses of water in its $CO_2$ capture and regeneration cycle. An advantage of the invention is that higher $CO_2$ capture capacity and low energy cycle requirements results in lower costs that are suitable for utility emission streams.

Yet another object of the present invention is to provide a method which produces sorbents which adsorb over a range of temperatures. A feature of the invention is that the sorbents provided by this method adsorb or otherwise sequester $CO_2$ from 25° C. to 65° C. via a combination of both physical and chemical adsorption processes. An advantage of the invention is that these sorbents can adsorb at temperatures above normal ambient temperatures, and well above 30° C.

Still another object of the present invention is to provide a method which produces a sorbent which is easily regenerated. A feature of the invention is that regeneration of the sorbent can be accomplished by heating to around 90° C. An advantage of the invention is, that the regeneration process is inexpensive.

Yet another object of the present invention is to provide a method which produces sorbents which are thermally stable. A feature of the invention is that the sorbents provided by this method can be heated to temperatures above 100° C. with little or no degradation. An advantage of the invention is that these sorbents have a longer life span of usefulness.

Briefly, the invention provides a process for producing a $CO_2$-capturing sorbent complex, the method comprising identifying an amine which reacts with $CO_2$ to form carbonate; increasing the number of secondary amine groups on the amine, thereby modifying the amine; and treating a solid substrate with the modified amine so as to cause the modified amine to adhere to the substrate.

The invention also provides a process for removing carbon dioxide from a fluid, the method comprising affixing a modified amine to a porous substrate to create an amine-substrate construct pretreated with $He/H_2O$ and contacting the fluid to the construct for a time and at a temperature sufficient for $CO_2$ to react with the amine and extract the $CO_2$ from the fluid.

The invention further provides a method for affixing an amine to a porous substrate which comprises treating a porous substrate with an amine in the presence of a solvent, wherein the solvent is an organic alcohol.

BRIEF DESCRIPTION OF DRAWINGS

The invention together with the above and other objects and advantages will be best understood from the following detailed description of the preferred embodiment of the invention shown in the accompanying drawings, wherein.

DETAILED DESCRIPTION OF THE INVENTION

This invention provides a new method for the production of low-cost $CO_2$ capture sorbents. Specifically, this invention relates to a method for use of an amine composed chiefly of secondary amine groups that is incorporated into the pore structure of a high surface area support substrate. The method utilizes a simple two-step treatment to give an effective, efficient, and stable regenerable $CO_2$ sorbent. As such, the invention can be applied to a myriad of fluids resulting from large-scale utility processes, such as flue gas streams and natural gas, and under a variety of conditions. The invention employs an amine incorporated into the pore structure of a support substrate. The substrate also provides the amine with structural integrity and a high surface area for gas/solid contact.

The sorbents are produced via simple reactions whereby the amine is modified to increase secondary amine functionalities, and the resulting amine is then incorporated into the pore volume of a solid substrate. Typically, the incorporation process is conducted in organic solvent media.

In one embodiment, the sorbent comprises secondary amines, not cross-linked with an acrylonitrile substrate, which are effective in the capture of carbon dioxide. An example of such an amine is 1-(2-Hydroxyethyl)piperazine.

While the prior art is limited to closed environmental systems only, the present invention will be used in industrial applications such as coal combustion flue gas and natural gas clean-up in addition to uses in environmental systems. In addition, the invented sorbent operates in the presence of low levels (i.e., 10-50 ppmv concentrations) of $SO_X$ and $NO_X$ gases.

Figure 1:
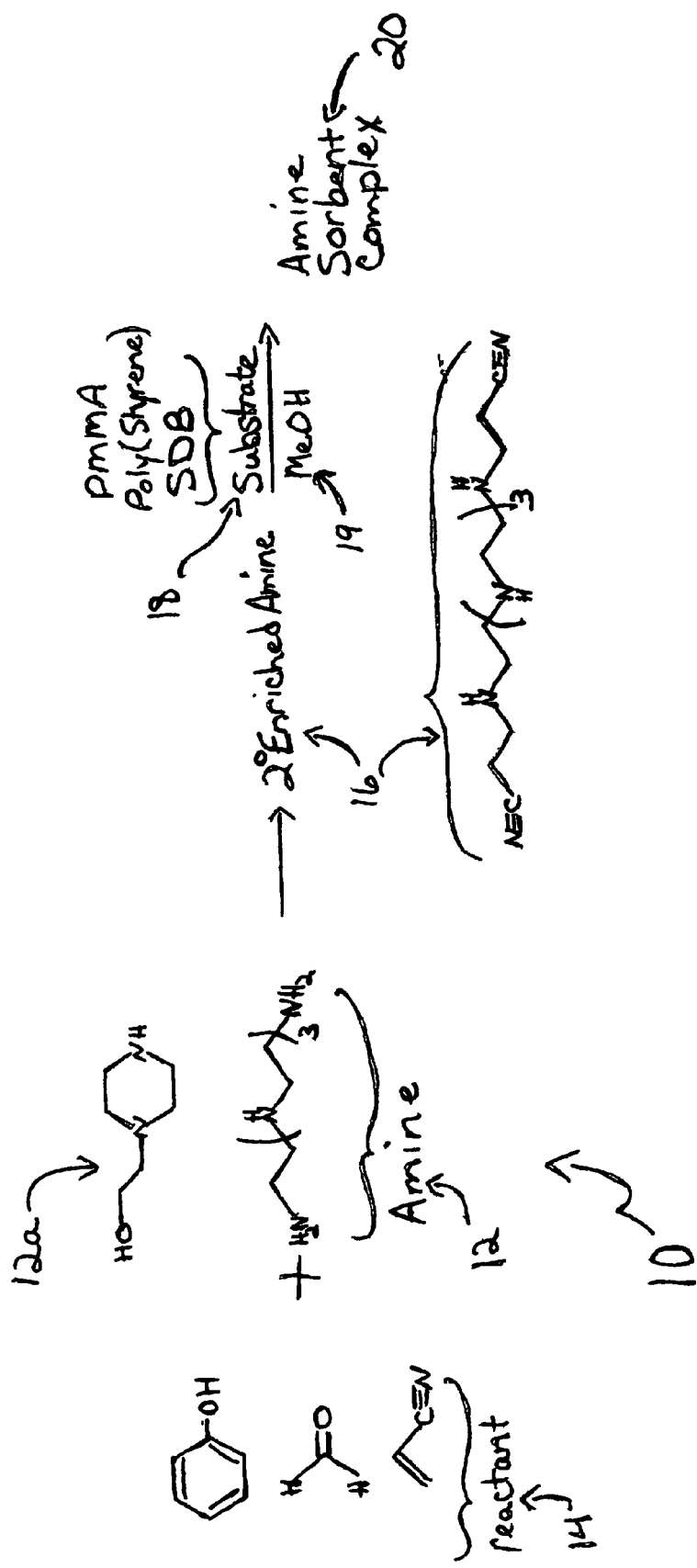
FIG. 1 is a reaction sequence for producing an amine-enriched sorbent, in accordance with features of the present invention.

The protocol, designated as numeral 10 in FIG. 1, has two major steps: 1) modification of an amine and, then 2) impregnation of the support substrate with the modified amine. Specifically, in the first step, a nucleophilic primary amine 12 attacks a reactant 14 to add across a carbon-carbon double bond (via an intermediate carbanion which is stabilized by the electron withdrawing moiety of the reactant 14) to create a secondary amine 16 in a Michael addition reaction. In the second step, the now created amine 16 (sans any primary amine groups) is contacted with a support substrate 18 having a suitable surface area for a time and at a temperature sufficient for the modified amine 16 to impregnate the pores of the support structure 18. Optionally, the modified amine 16 is contacted with the support substrate 18 in the presence of a solvent 19 that reduces surface tension.

Alternatively, use of an amine 12a that does not have any primary amine groups may forego the modification step, and said amine 12a may be impregnated into the pores of the support structure 18 directly with or without the presence of a solvent 19.

Equation 3 depicts an exemplary reaction incorporating ethyleneamine and a nucleophilic reactant, (here, acrylonitrile):

Equation 3:

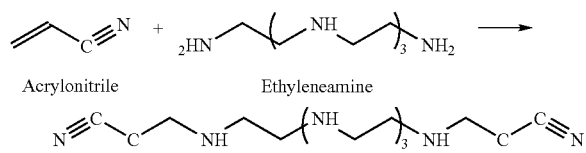

Acrylonitrile    Ethyleneamine

The addition reactions are conducted under nucleophilic conditions with the nitrile group stabilizing the intermediate carbanion.

Amine Preparation

Detail

Preparation of the amine sorbent begins with liquid amine comprising primary, secondary, and/or tertiary amines. The amines can be saturated and/or unsaturated linear, cyclic, heterocyclic, and aromatic chemical structures. Exemplary amines are those with molecular weights of between 250-300 grams/mole and include Ethylene-amine E-100 (Huntsman Chemical, CAS #00068131-73-7), which comprises a mixture of tetraethylenepentamine (TEPA), pentaethylenehexamine (PEHA), and hexaethylene-heptamine (HEHA); 1-(2-hydroxyethyl)piperazine; and others.

If the amine contains primary amine groups, the liquid amine is modified via a Michael reaction with a reactant to increase the number of secondary amine groups and eliminate the number of primary amine groups in the product. The protocol for the reaction is similar to that disclosed in Birbara et al. U.S. Pat. No. 6,364,938, and incorporated herein by reference. Increasing the secondary amine groups in the sorbent increases the cyclic $CO_2$ removal capacity of the amine. The secondary and tertiary amines are more reactive in $CO_2$ capture because of the increased stability of the proposed carbamate ion formed during the capture of carbon dioxide.

Suitable reactants are those with electron withdrawing groups to facilitate nucleophile production in the reaction sequence. Exemplary reactants include phenol, formaldehyde and phenol, and acrylonitrile and other nitrile compounds. Unsaturated nitrile compounds are preferred reactants with primary amines because the nitrile moiety is a good electron withdrawing group. Alcohols and aldehydes also may used as reactants under electrophilic conditions.

In the addition reaction, the reactant is added in quantity of about 10% greater than stoichiometric ratio to the primary amine groups. For example, for the linear version of PEHA (which contains 4 secondary amine and 2 primary amines), 2.2 moles of reactant are added for every mole of primary amine (2 primary amines+10%=2.2 moles).

The reactant is added slowly to the amine while continuously stirring the amine. A slow addition of the reactant facilitates complete consumption of the reactant and prevents the temperature of the reaction vessel from rising quickly in this exothermic reaction. Also, during this addition process the amine/reactant mixture is cooled to maintain a temperature of approximately 15° C. Once all of the reactant has been added, the mixture is heated to a temperature of about 50° C. to insure all of the reactant has been consumed in the primary amine/reactant reaction.

As noted supra, the second step is the treatment of the solid support substrate with the amine. Typically, the volume of the amine to be impregnated is 75-85% of calculated available pore volume in the support substrate. After determining the volume of amine required, an equal volume mixture of amine to solvent is prepared. Use of solvent solubilizes the amine while also reducing the surface tension, thus facilitating amine impregnation into the support substrate pore volume. Suitable solvents are those which to dissolve the amine completely and have a vaporization pressure sufficient to assure their removal from the substrate via evaporation. Exemplary solvents include alcohols such as methanol, ethanol, propanol, butanol, and pentanol.

The amine/alcohol mixture is added to the support substrate. Optionally, additional solvent is introduced to completely wet the support. The amine impregnates into the substrate by capillary action and chemical affinity drive forces. The amine, alcohol and support slurry mixture reaction vessel is then subjected to heat at a temperature of about 90° C. and a vacuum is applied to the gas space above the slurry for a time sufficient to evaporate the solvent from the support. The final product is a polymeric (i.e., composite) support with a fraction (from 30% to 85%, as determined by gravimetric analysis) of its theoretical pore volume occupied by the amine. The incorporation of the amine is determined by surface area analysis. In exemplary embodiments, the uncharged substrate initially has a surface area of approximately 600-1000 $m^2$/gram, and after introduction of the amine, the surface area of the final product is reduced to approximately 100-300 $m^2$/gram. The amine is not chemically bonded to the surface of the substrate, but rather immobilized within its pore structure. The final product behaves like a solid sorbent.

Support Substrate

Detail

A myriad of substrates can be utilized as a porous support for the amine. Exemplary solid substrates include, but are not limited to, poly (methyl)methacrylate (PMMA), poly (styrene), styrene divinylbenzene (SDB), fly ash, carbon, alumina, and other porous substrates. Porous substrates such as molecular sieves and carbon nanotubes may also be used as determined by application and cost requirements. Generally, substrates with surface areas of approximately 200 $m^2$/gram to 1000 $m^2$/gram and a pore volume of approximately 0.05 ml/gram to 1.2 ml/gram are suitable support substrates. The support may be granular, spherical, cylindrical, disc-like structures, or any other shape that allows for a porous substrate with such structures typically measuring 0.2 mm to 1.0 mm in diameter/size.

The final sorbent product is a solid support that has the amine captured within its pore structure to serve as a solid acid gas capture agent. The amine has been incorporated throughout the substrate by capillary action and chemical affinity drive forces. The nominal pore size of the substrate must be at least large enough to allow passage of $CO_2$ molecules, which are approximately 4-5 Å in size.

For example, poly (methyl)methacrylate (PMMA) is a bead-like substrate that has a surface area of about 470 m$^2$/gram (as measured by manufacturer Mitsubishi Chemical (Diaion® HP2MG)). The support provides a pore volume of about 1.2 ml/gram with a nominal pore diameter of 170 Å. The bead-like structures range in diameter from 0.35 mm to 0.84 mm.

Generally, the invented sorbents adsorb $CO_2$ from 25° C. to 65° C., retain $CO_2$ from 65° C. to 80° C., then desorb at temperatures in the range of 90° C. to 200° C., depending on the thermal stability of the chosen amine. Typical desorption temperatures range between approximately 90° C. and 100° C. Generally, the adsorption occurs in a gas-solid interaction, wherein gaseous $CO_2$ reacts with solid amine located in the pores of the substrate. The carbon dioxide is complexed with the amine in the pore structure of the substrate in the form of bicarbonate as shown in FIG. 1.

The enriched sorbent can desorb $CO_2$ at temperatures as high as 150° C. to 200° C. without thermal degradation of the support-sorbent construct, as determined by the thermal tolerance of the support substrate. Thus, the amine-enriched substrate can be readily regenerated. An exemplary method for regenerating the sorbent is to expose the sorbent to a moist helium stream at a temperature of about 90° C. for a period of 30 minutes to 60 minutes. This regeneration can occur in the absence of water, but a moist regeneration cycle is preferred.

The presence of moisture is beneficial to the long term stability of the subject material and the carbon dioxide retaining complex. The presence of water aids in the formation of the bicarbonate compound during $CO_2$ capture. Notwithstanding the foregoing, the water requirements of the invented sorbents are less than the energy-intensive quantities required for use of sorbents disclosed in the prior art.

EXAMPLES

Figure 2:
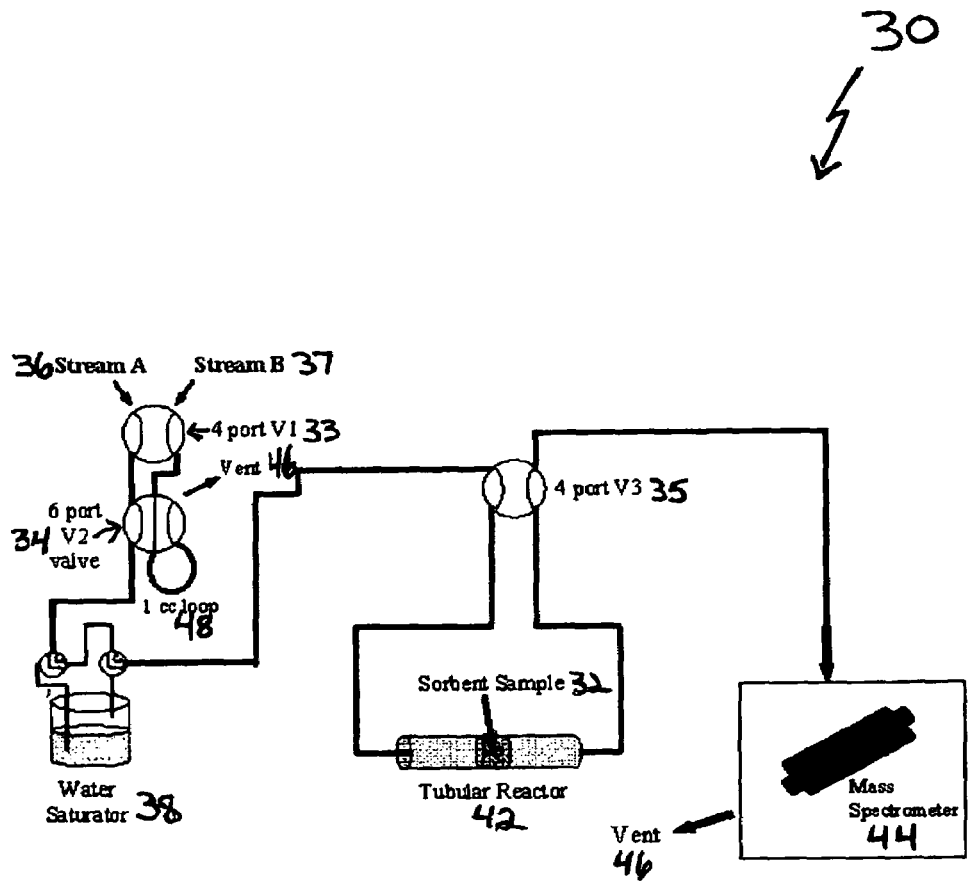
FIG. 2 is a schematic diagram of an experimental system for analysis of $CO_2$ adsorption/desorption, in accordance with features of the present invention.

In order to understand the reaction of $CO_2$ on these amine-enriched solids and assess their relative $CO_2$ uptake capabilities, adsorption studies followed by a combination temperature-programmed-desorption (TPD) and mass spectroscopy (MS) techniques were conducted under ambient pressure and at temperatures between 25° C. and 65° C. on a mass spectrometer. A schematic diagram of the experimental system is depicted in FIG. 2 as numeral 30. A detailed description of the experimental procedure is found in Chang, A. C. C., Chaung, S. C. C., *Energy & Fuels*, 2003, 17, p. 469 and is incorporated herein by reference.

The compositions of the experimental gas stream was 10% $CO_2$/He/$H_2O$. The detailed operating conditions for this procedure were previously described by the inventors in Soong, Gray et al., "Novel Amine Enriched Solid Sorbents for Carbon Dioxide Capture," *Fuel* preprint, 2001 46(1), 285 which is incorporated herein by reference and briefly described infra. The instant invention differs from the prior art identified above in that the prior art sorbents utilized primary amines which were chemically bonded to the substrate surface in an aqueous media. The present invention focuses on the use of primary, secondary, and tertiary amines dissolved into a solvent and then immobilized into the substrate. As such, the amines are not chemically bonded to the surface of the substrate.

Table 1 describes operational conditions of key components in the experimental system.

TABLE 1

| | Operational Envelope Conditions | | | |
|---|---|---|---|---|
| Equipment | Temperature minimum, ° C. | Temperature maximum, ° C. | Pressure minimum, psig | Pressure maximum, psig |
| Stainless Steel 316 Reactor | 25 | 125 | atmospheric | atmospheric |
| Water Saturator | 25 | 60 | atmospheric | atmospheric |
| Mass Spectrometer | 25 | 25 | atmospheric | atmospheric |

A summary of typical gas mixture conditions is shown in Table 2. Additional reaction gases (for example, helium, oxygen, sulfur dioxide, nitrogen, nitrogen dioxide, and argon) may also be incorporated into the gas mixture shown in Table 2 at flow rates of 0-300 ml/min. The invented sorbents may perform in the presence of low levels (i.e., 10-15 parts per million by volume (ppmv) concentrations) of sulfur oxides ($SO_X$) and nitrogen oxides ($NO_X$) gases. Such additional gases are typically present in utility emission streams such as coal combustion flue gas and natural gas clean-up streams.

TABLE 2

| Typical Gas Mixture Conditions | | | |
|---|---|---|---|
| Condition 1 | Condition 2 | Condition 3 | Condition 4 |
| He/$H_2O$ Line Flush (Pretreatment) | 10% $CO_2$/He/$H_2O$ Adsorption at 25-65° C. | He/$H_2O$ Desorption at 90-125° C. | He/$H_2O$ Cool down at 125-25° C. |

Sorbent 32 is contained within an environmentally-controlled chamber 42. As such, all gas flows to the reaction chamber 42 are regulated with mass flow control valve V1 33, valve V2 34 and valve V3 35. Moisture is added to a helium gas stream 36 and a $CO_2$-containing effluent stream 37 via a water saturator 38 maintained at temperatures of approximately 25-60° C. and at a partial pressure of $H_2O$ at 1 atm.

In commercial and industrial applications, sorbent amounts will vary with concentration levels of $CO_2$ and volume amounts. The sample 32 is placed in the reaction chamber. A separate temperature control system exists on the reactor 42. The sample 32 in the reactor tube 42 is pretreated with a moist helium stream 36 or some relatively inert but moisture-containing fluid prior to experimental test runs.

Experimental samples 32 were contacted with gas streams containing 5 to 15 percent by volume (v) carbon dioxide, as such concentrations are common in the utility industry. An exemplary gas stream comprising 10% $CO_2$/$H_2O$/He was passed through the sorbent bed reactor 42.

The effluent from the tubular reactor 42 is analyzed by mass spectrometer 44. This allows for determination of the $CO_2$ concentration in the effluent stream. Effluent exits the system through vents 46 positioned both downstream of a sampling loop 48 and also after the mass spectrometer 44.

The number of recycle tests and the $CO_2$ capture capacities are determined by the performance of these solid amine sorbents under these conditions. All tests were conducted at atmospheric pressure and flow rates of 5-300 ml/min at temperatures in the range of 25° C. to 125° C.

In operation, the reactor 42 is preheated at 25° C. with a helium stream 36 (Stream A on FIG. 2) flowing at 200 ml/min for 30 minutes through valve V1 33, valve V2 34, and valve V3 35, the water saturator 38 and the reactor bed 42. Then, by turning valve V1 33 the helium stream 36 is sent to a vent 46 and the 10% $CO_2$/He/$H_2O$ mixture 37 (Stream B) flows through valve V2 34. Switching valve V3 35 allows bypass of the reactor bed 42 in order to establish a baseline concentration of $CO_2$ in the system by mass spectrometer 44 analysis. After baseline measurements have been completed, valve V3 35 is switched to allow the reaction gas stream 37 to pass through the reactor bed 42 at a flow rate of 100-180 ml/min and mass spectrometer 44 measurements are recorded to determine the $CO_2$ concentration over time (30-45 minutes) as the gas stream exits the reactor bed 42. The adsorption temperatures for the experimental test runs are maintained between 25° C. and 65° C. Upon completion of the adsorption of $CO_2$, valve V1 33 is switched to stop the flow of reaction gases 37 and to allow flow of moist helium 36 through the reactor bed 42 at a rate of 200 ml/min.

Desorption of $CO_2$ occurs over a temperature range of 90° C. to 125° C. Upon completion of desorp-tion step, the reactor bed 42 is allowed to cool down under these conditions until it reaches a temperature of 25° C. The cooled sorbent 32 is either removed or recycled for additional test runs.

X-ray photoelectron spectroscopy (XPS) was used to determine the surface composition of these amine-enriched sorbents, specifically the amount of nitrogen (N1s peak) on the surface of the sorbents. The XPS analyses were conducted at $1\times10^{-8}$ torr with a surface analysis depth range of from 30 Å to 50 Å. The increase in the secondary amine loading in the sorbent, which is indicated by the higher percentage nitrogen value of 21.9 (as measured by XPS), resulted in average $CO_2$ capacity increasing more than 50-100 percent compared to state of the art sorbents utilizing primary amine groups as $CO_2$ capture agents. Specifically, typical $CO_2$ capture capacities of prior art sorbents range from 1500-2000 µmole $CO_2$/gram sorbent, while the invented sorbent has a $CO_2$ capacity in excess of 3400 µmole $CO_2$/gram sorbent, as detailed in Gray, M. L., et al., "Capture of Carbon Dioxide by Solid Amine Sorbents" *Int. J. Environmental Technology and Management*, Vol. 4, Nos. ½, 2004, p. 82-88), and incorporated herein by reference.

The comparison of the $CO_2$ capture capacities and XPS results for exemplary sorbents and a commercial sorbent based on a prior art patent (U.S. Pat. No. 5,876,488) are summarized in Table 3 infra. For example, Table 3 shows that exemplary sorbent 139A demonstrated an average $CO_2$ capture capacity of 3411.8 µmole $CO_2$/gram sorbent compared to a prior art sorbent (U.S. Pat. No. 5,876,488), which has an average $CO_2$ capture capacity of 3245.0 µmole $CO_2$/gram sorbent.

TABLE 3

Performance of Immobilized Solid Amine Sorbents

| Sorbent | Amine | Support | XPS N1s | µmole $CO_2$/ gram |
|---|---|---|---|---|
| 139A | E-100/Acrylonitrile[1] 1:2.2 | Diaion ® HP2MG[2] (PMMA) | 21.93 | 3411.8 |
| 142A | E-100/Acrylonitrile 1:2.2 | Diaion ® HP2MG (PMMA) | 14.83 | 4253.1 |

TABLE 3-continued

Performance of Immobilized Solid Amine Sorbents

| Sorbent | Amine | Support | XPS N1s | µmole $CO_2$/ gram |
|---|---|---|---|---|
| 143A | 1-(2-Hydroxyethyl) piperazine | Diaion ® HP2MG (PMMA) | 1.68 | 4202.3 |
| 144A | 1-(2-Hydroxyethyl) piperazine | Macronet MN-200[3] (Poly(Styrene)) | 5.92 | 4504.6 |
| 145A | Standard U.S. 5,876,488[4] | Standard U.S. 5,876,488 | 17.7 | 3245.0 |

[1] Ethyleneamine E-100 comprises a mixture of tetraethylenepentamine (TEPA), pentaethylenehexamine (PEHA), and hexaethyleneheptamine (HEHA) and other amines from Hunstman Chemical (CAS #00068131-73-7) Houston, Texas.
[2] Diaion ® HP2MG is a non-polar poly(methyl)methacrylate (PMMA) support manufactured by Mitsubishi Chemical, Tokyo, Japan.
[3] Macronet MN-200 is a cross-linked poly(styrene) manufactured by The Purolite Company, Bala Cynwyd, PA.
[4] The amine and support identified as "Standard US 5,876,488" represents commercial materials similar to the one described in U.S. Pat. No. 5,876,488, such as diethanolamine (DEA) (45 wt. % to 65 wt. %) on a porous support formed from an acrylic ester polymer.

The compound 1-(2-hydroxyethyl)piperazine is not treated with a reactant such as acrylonitrile because it already contains a secondary amine (and does not contain any primary amines) within its chemical structure.

Conditions for the above experimental tests comprise the following: A one gram sample was pre-treated with a He/$H_2O$ at 180-200 ml/min at 25° C. and then exposed to 10% $CO_2$/He/$H_2O$ at 170 ml/min flow rate. Pretreatment is preferred to assure that there is adequate moisture on the surface of the sorbent to facilitate adsorption of carbon dioxide. The presence of water is preferred for the adsorption of $CO_2$ by the invented sorbents. The adsorption temperature is 25° C. and the sorbents are regenerated at a temperature of about 90° C. in a He/$H_2O$ atmosphere at 180-200 ml/min flow rate. The $CO_2$ capture capacity measurement reported above is the average of four test runs.

Figure 3:
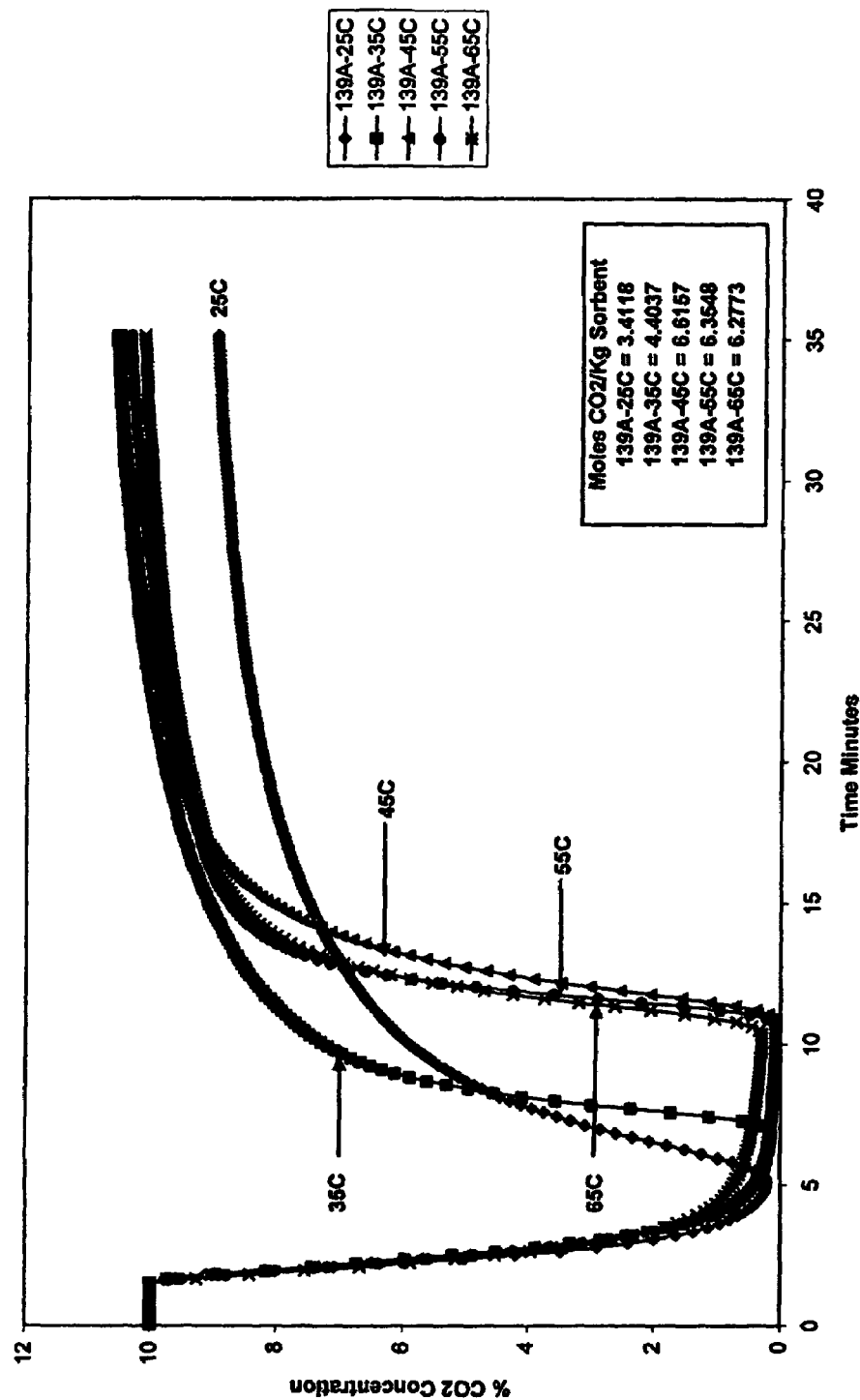
FIG. 3 is a temperature dependent adsorption profile curve for an exemplary sorbent, in accordance with features of the present invention.

A temperature dependent adsorption profile curve for an exemplary sorbent (139A) is depicted as FIG. 3. $CO_2$ capture capacity is reported for temperatures in ten degree increments ranging from between 25° C. and 65° C. As shown in the figure, the invented sorbents sequester $CO_2$ above ambient temperatures with increased $CO_2$ capture capacities at temperatures between 45° C. and 65° C. Specifically, exemplary sorbent 139A demonstrates a $CO_2$ capture capacity of 3411.8 µmol $CO_2$/gram sorbent at 25° C. and a $CO_2$ capture capacity of 6615.7 µmol $CO_2$/gram sorbent at 45° C.

In summation, the invented amine-enriched sorbents chemically adsorb carbon dioxide and water upon contact with a gaseous stream. Temperature gradients drive the reaction between carbon dioxide, water and amine in the reverse direction and regenerate the amine and release the adsorbed carbon dioxide and water.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for producing a CO2-capturing sorbent complex, the method comprising:

a) identifying an amine which reacts with CO2 to form carbonate at temperatures ranging from 25° C. to 65° C.;

b) increasing the number of secondary amine groups on the amine, thereby modifying the amine;

c) treating a solid porous substrate with the modified amine so as to cause the modified amine to adhere to the substrate; and d) regenerating the modified amine in situ in the presence of water vapor.

2. The method as recited in claim 1 wherein the amine contains amine groups selected from the group consisting of primary amine groups, secondary amine groups, tertiary amine groups, aromatic amine groups and combinations thereof.

3. The method as recited in claim 1 wherein the secondary amine groups are increased by contacting the amine with a reactant selected from the group consisting of phenol, formaldehyde and phenol, acrylonitrile, and combinations thereof.

4. The method as recited in claim 1 wherein the modified amine adhere to the substrate through impregnation of the amine into the pores of the substrate.

5. The method as recited in claim 1 wherein the volume of modified amine present comprises between about 75% and 85% of the available pore volume of the substrate.

6. The method as recited in claim 1 wherein the substrate has a pore volume of between 0.05 ml/gram and 1.2 ml/gram.

7. The method as recited in claim 1 wherein the substrate has a surface area between approximately 200 m2/gram and 1000 m2/gram.

8. The method as recited in claim 1 wherein the sorbent complex is produced at a temperature selected between 10° C. and 90° C.

* * * * *